P. G. Bryan,
Music Notation.
No. 109,109.  Patented Nov. 8, 1870.

Witness:
E. F. Huyck
W. W. Pullen

Inventor
Parish G. Bryan

UNITED STATES PATENT OFFICE

PARISH G. BRYAN, OF LOUISVILLE, KENTUCKY.

IMPROVEMENT IN TRANSPOSING SCALES FOR TEACHING MUSIC.

Specification forming part of Letters Patent No. 109,109, dated November 8, 1870.

I, PARISH G. BRYAN, of the city of Louisville, county of Jefferson, and State of Kentucky, have invented a new and useful Improvement or System of Illustrating the Transposition of the Scale in Music, by means of cards adapted to the purpose, for the use of teachers and pupils engaged in the study of the art, of which the following is a specification:

The nature of my newly-invented system of the transposition of the scale in music consists in the use of two or more cards, made of heavy card-paper or other suitable material, one of which is so lined and colored as to represent the key-board of a piano containing two or more octaves, the other having only corresponding lines drawn across the face, representing the keys of the piano also, but containing only one octave in chromatics, with the natural scale indicated by the figures of the scale on their respective keys on the lower end of the cards, and pointed to by the sign above, that the pupil may see at a glance the relative position of the tones and semitones as they occur in the scale.

Figure 1:
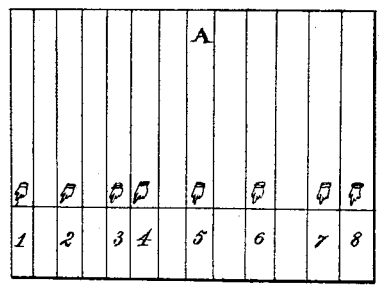

When teaching piano-music, and it becomes necessary to proceed to transposition, it is only necessary to place this last-named card on the back part of the key-board immediately behind the black keys, with the figured end downward, figure 1 resting on C of the piano; and it will be seen, by reference to the keys, that all the notes in that scale will require the use of the white keys to play them, and hence is called the "natural scale."

In order to further transpose the scale, remove the card, so that figure 1 will rest on G, and it will readily be seen that F must be sharped in order to make the semitones come in their proper places in the scale; and by removing the card so that figure 1 will rest on D of the piano, it will be seen that F and C must be sharped in that scale, and so on throughout the entire scale until all the notes are sharped; and in like manner in order to transpose by flats.

In teaching vocal music it becomes necessary to use the card representing the piano key-board in order to illustrate the scale as represented by the arrangement of the keys on that instrument, and to show what letter of the scale each key of the instrument is made to represent; but in all respects this last-named card is a substitute for the piano key-board, and is used in the same manner by teachers in teaching vocal music, where the piano cannot be used.

On the back of each of the above-named cards will be found full instructions in reference to the manner of using them.

Having thus described my newly-invented system of teaching transposition by the use of cards, a full description will be seen by reference to the drawing.

Figure 2:
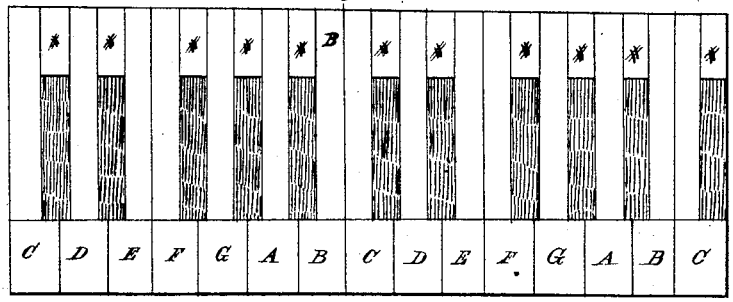

Figure 1 is a card, representing one octave of the scale divided in chromatics, with the figures, as they occur in the natural scale, marked on their respective keys. This card is called the "transposition-card." Fig. 2 is a card representing the key-board of a piano containing two or more octaves, and is used only as a substitute for the piano where one cannot be used, as in teaching classes in vocal music. Therefore,

What I claim as new, and desire to secure by Letters Patent, is—

1. The card A, for teaching transpositions of the musical scale, made substantially as and for the purpose set forth.

2. The card B, used in connection with card A, for teaching transpositions of the musical scale, substantially as in the manner shown.

PARISH G. BRYAN.

Witnesses:
E. F. HUYCK,
WM. PULLEN.